United States Patent Office 3,436,361
Patented Apr. 1, 1969

3,436,361
QUICK DRYING URETHANE COATINGS
George S. Wooster, Hamburg, N.Y., assignor to Allied Chemical Corporation, New York, N.Y., a corporation of New York
No Drawing. Filed June 9, 1966, Ser. No. 556,269
Int. Cl. C08g 22/24, 22/06; C09d 3/72
U.S. Cl. 260—18
7 Claims

ABSTRACT OF THE DISCLOSURE

Novel urethane coating compositions characterized by excellent hardness and rapid drying properties derived from the reaction of methylene-bis(4-cyclohexylisocyanate) with a mixture of polyols comprising an aliphatic polyol and an oxyalkylene ether of an aromatic diol.

---

This invention relates to novel coating compositions. More particularly, it relates to novel urethane coating compositions derived from methylene-bis(4-cyclohexylisocyanate) which are characterized by excellent hardness and rapid drying properties.

Coating compositions derived from aliphatic polyisocyanates, e.g., methylene-bis(4-cyclohexylisocyanate) are known but such coatings, though remarkably color stable, have been deficient in one or more essential characteristics, notably they are slow drying and the hardness of the cured film leaves something to be desired.

It is therefore a principal object of this invention to devise novel urethane coating compositions which are characterized by being quick-drying and by producing cured films of excellent hardness.

Another object is to provide a novel process for the preparation of the new coating compositions derived from methylene-bis(4-cyclohexylisocyanate).

Other objects and advantages ancillary thereto will be obvious from the following description of my invention.

The coating compositions of the present invention are urethane reaction products of an aliphatic polyisocyanate, particularly methylene-bis(4-cyclohexylisocyanate), with a mixture of polyols comprising an oxyalkylene ether of an aromatic diol. These novel compositions contain free isocyanato groups and cure by reaction with atmospheric moisture. Accordingly the novel compositions of my invention belong to the valuable class of moisture cured urethane coatings.

The preferred isocyanate component is a solvent solution of methylene-bis(4-cyclohexylisocyanate) itself. Less preferably, an isocyanate rich adduct of this isocyanate, likewise in solvent solution, can be used. Such an adduct containing free isocyanato groups is prepared by heating together a polyol, such as trimethylol propane, under essentially anhydrous conditions. The isocyanate component is combined with the polyol component, a mixture of a polyalkylene ether polyol or a hydroxyl rich fatty acid polyester, such as castor oil, and an oxyalkylene ether of an aromatic polyol, such as the reaction product of 1,2-propylene oxide with 4,4'-isopropylidene diphenol ("Bisphenol A"). This step is preferably carried out in the presence of a catalyst, preferably an organic tin compound, e.g., dibutyltin diacetate. The isocyanate and polyol components are combined in such amounts as to provide an excess of isocyanato groups, preferably to provide an NCO/OH ratio of 1.5:1 or greater. The preparation of adducts of organic isocyanates and polyols such as polyethers, polyesters, etc. in urethane coatings are well known in this art and will not be discussed further here. For a general discussion of these compounds, see Saunders et al., Polyurethanes, Chemistry and Technology, Part II, Technology, High Polymers, vol. XVI, Interscience Publishers (1962), pp. 453 to 468 and 477 to 485.

Other aliphatic polyisocyanates, for example, cyclohexyl-2,5-diisocyanate, 1,6-hexamethylene-diisocyanate, 1,5 - pentamethylene-diisocyanate, 4,4'-methylene-bis(2-methylcyclohexylisocyanate) and the like as well as mixtures of these and equivalent compounds can be used also.

The novel compositions of tht present invention, which can be applied to a substrate by conventional methods, i.e., by spraying, brushing, dipping, flow coating and the like, dry to tack-free films in 1 to 8 hours. This drying rate is suprisingly quicker than analogous coating compositions which do not include the oxyalkylene ether of an aromatic diol. When cured, the improved films are not only nonyellowing, a property expected of aliphatic urethanes, but additionally the cured films are extremely hard and tough, possessing excellent abrasion and impact resistance. The films are also characterized by excellent adhesion to metal surfaces.

The polyol component of the novel coating compositions is a mixture of at least two polyols, which are (1) An aliphatic polyol, such as a polyalkylene ether polyol or a hydroxyl rich polyester of an aliphatic acid, and (2) An aromatic diol of the class hereinbelow further defined.

This mixture of polyols should have an average functionality, i.e., contain an average number of active hydrogens capable of reacting with isocyanato groups, of at least 2 and preferably in the range of about 2.1 to about 3.5 and especially in the range of about 2.2 to 2.8.

The polyol mixture should also be such as to provide at least 0.3 equivalent of aromatic diol derived hydroxyl group for each equivalent of hydroxyl group derived from the aliphatic polyol component. Preferably from 0.5 to about 2 equivalents of aryl diol hydroxyl should be present for each aliphatic polyol hydroxyl group present.

The aliphatic polyol component of the polyol mixture of these novel coating compositions may be a vegetable glyceride oil such as castor oil, soya oil and the like or a hydroxyl terminated polyester such as a polyethylene adipate, a polyalkylene ether diol, triol, tetrol, pentol, or mixtures thereof. The polyalkylene ether polyols are well known in this art, are readily available commercially, and are believed to have essentially the following general formula

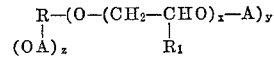

wherein R is the residue of a polyol exemplified below; $R_1$ is hydrogen or methyl; A is hydrogen,

—$CH_2$—$CH_2$—OH $CH_2$—CH(OH)$CH_3$, or $CH_2$—$CH_2$—$CH_2$OH; $x$ is an integer from 1 to 25; $y$ is an integer at least 1 and preferably 1 or 2 and $z$ is an integer from 0 to 5. Such polyalkylene-ether polyols can be obtained in a well known manner by condensation of an alkylene oxide, such as ethylene oxide, 1,2-propylene oxide, or mixtures thereof, with polyhydric alcohols such as ethylene glycol, propylene glycol, dipropylene glycol, tetramethylene glycol, glycerine, trimethylol propane, pentaerythritol, sorbitol, sucrose, or mixtures thereof in the presence of a catalyst such as a trialkylamine, e.g., trimethylamine or an inorganic base, e.g., potassium hydroxide, or a metal halide, e.g., boron trifluoride.

Polyalkylene ether polyols derived from mixtures of ethylene oxide and 1,2-propylene oxide contain a major proportion of secondary hydroxyl groups and only a minor proportion of the more reactive primary hydroxyl groups. The reactivity of such polyethers can be enhanced, as it is known, by reaction with ethylene oxide or 1,3-propylene oxide, thereby to obtain a polyether polyol having an increased proportion of primary hydroxyl groups. Such polyols are known in this art as "tipped" or "capped" polyether polyols.

A general discussion of polyether polyols, their preparation and utilization in the preparation of urethane structures can also be found in Saunders et al., cited supra, Part I, Chemistry, pages 32–44.

The aromatic diol component of the polyol mixture used in the preparation of the quick-drying coatings of this invention is derived by reaction of an alkylene oxide or mixture thereof with a dihydric phenol. The latter may contain the hydroxyl groups in the same ring, as in resorcinol or in different nuclei of a fused ring system, as in 1,5-naphthalenediol, or in different nuclei of polynuclear compounds wherein the nuclei are connected by chains composed of one or more atoms, as in 4,4'-methylenebisphenol and 4,4'-dihydroxydiphenylsulfide. The aryl nuclei may contain additional substituents such as alkyl, alkoxy, halogen, nitro, dialkylamino and the like. The additional substituents preferably are free from active hydrogen containing groups (other than the two hydroxyl groups) as such groups may react with isocyanates and affect the stability of the coating composition or otherwise introduce factors which are difficult to control and thus alter the properties of the resulting product. These dihydric phenols are, in general, known compounds and can be prepared by conventional procedures. The following compounds are typical of the dihydric phenols useful in this connection:

Resorcinol
4-amyl-resorcinol
1,5-naphthalenediol
1,8-naphthalenediol
5-chloro-2,7-naphthalenediol
4,4'-methylenebisphenol
4,4'-isopropylidenediphenol
4,4'-isopropylidenebis(3,5-dichlorophenol)
4,4'-isopropylidenebis(3,3-dibromophenol)
4,4'-isopropylidenedi-o-cresol
4,4'-ethylene-ar,ar-diphenol
4,4'-oxydiphenol
4,4'-thiodiphenol
4,4'-oxydi-o-cresol Mixtures of these and equivalent dihydric phenols are contemplated also.

The preferred dihydric phenol is the well known and readily available 4,4'-isopropylidenediphenol, otherwise known as "Bisphenol A."

These dihydric phenols are reacted with an alkylene oxide or mixture of alkylene oxides in a known manner to convert the phenolic hydroxyl groups to aliphatic hydroxyl groups. The resultant aromatic diols can be defined by the following general formula

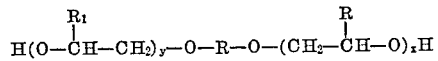

wherein R is the residue of an aromatic diol compound as hereinabove defined, $R_1$ is hydrogen or methyl, and $x$ and $y$ are the same or different integers, from 1 to 4.

In the above formula $R_1$ is preferably methyl and $x$ and $y$ are different, one being 1 and the other 2.

The product derived from the reaction of 4,4'-isopropylidenediphenol and propylene oxide having an equivalent weight in the range of about 200 to 210 and a hydroxyl value in the range of about 270 to 280 is preferred. Such a product corresponds to the aromatic diol derived from one mol of 4,4'-isopropylidenediphenol and about three mols of propylene oxide.

The novel coating compositions comprise a volatile solvent system as a carrier of the reactive film forming ingredients. Suitable solvents for this purpose include the usual lacquer type organic solvents, typical examples of which are ethyl acetate, butyl acetate, cyclohexanone, toluene, xylene, bis-($\beta$-ethoxyethyl)ether, glycol monoethylether acetate, and the like as well as mixtures of these and equivalent solvents. Preferably the solvents used are anhydrous or substantially so.

As indicated above, a catalyst can be used to promote the formation of the film forming urethane reaction product. Organo tin compounds are especially effective for this purpose and typical examples of such reagents are the following:

Dibutyltin diacetate
Dibutyltin dilaurate
Dimethyldioctyltin
Dilauryltin difluoride
Di-2-ethylhexyltin-bis(monobutylmaleate)
Tris-n-butyltin acetonate.

Dibutyltin diacetate is especially preferred because of its general effectiveness, its ready availability, and its relative economy.

Tertiary amines, such as N,N-dimethylpiperazine, triethylamine, and N-methylmorpholine can also be used.

Mixtures of these types of catalytic substances as well as equivalent compounds are contemplated in this connection, also.

The novel coating compositions can also contain pigments, fillers, flowing agents, other resins, ultra-violet absorbers, and the like adjuvants. The coatings can be dried and cured at ambient temperatures or in conventional baking ovens or both. The films prepared from these coating compositions dry "tack-free" in from about one to eight hours and attain their maximum properties after about one week or less at ambient temperature.

The following examples illustrate the present invention. Parts and percentages are by weight and temperatures are given in degrees centigrade.

EXAMPLES 1–6

A series of coating compositions, using various ingredients and proportions varied as indicated in Table I below were prepared as follows:

To a solution of methylene-bis(4-cyclohexylisocyanate) in xylene (about 75% solids) at about 40°, a mixed xylene Cellosolve acetate (ethoxyethyl acetate) solution of the polyols and catalyst was added at a rate such that the mixture is maintained at about 40° to 45°. This addition required about two hours. The reaction mixture was agitated and maintained at 40° to 45° until the amine equivalent of the reaction product attained the theoretical value or slightly above. The mixture was then cooled to about 25° and adjusted to 50% NV (nonvolatile solids content) by the addition of a mixture of solvents containing ⅔ xylene and ⅓ Cellosolve acetate, by weight, except as indicated.

TABLE I

| Reactant | Example | | | | |
|---|---|---|---|---|---|
| | 1 | 2 | 3 | 4 | 5 |
| Diisocyanate | 302 | 261 | 275 | 248 | 256 |
| Castor oil [1] | 178 | 206 | 326 | 0 | 0 |
| Polyether triol [2] | 0 | 0 | 0 | 223 | 344 |
| Aromatic diol [3] | 117 | 135 | 0 | 128 | 0 |
| Xylene | 398 | 401 | 401 | 400 | 400 |
| Cellosolve acetate | 119 | 201 | 200 | 430 | 200 |
| Dibutyltin diacetate | 0.45 | 0.45 | 0.45 | 0.45 | 0.45 |

[1] Triol, hydroxyl equivalent weight of 310.
[2] Polypropylene ether triol, glycerine initiated, molecular weight of about 1000 and hydroxyl number of 160.
[3] Propylene oxide derivative of 4,4'-isopropylidenediphenol molecular weight of 406 and hydroxyl number of 277.

The physical characteristics of the resultant coating compositions are set out in Table II below.

TABLE II

| Characteristics | Example | | | | |
|---|---|---|---|---|---|
| | 1 | 2 | 3 | 4 | 5 |
| Percent NV | 50 | 50 | 50 | 42 | 50 |
| Gardner viscosity | C | T-U | B-C | V-W | G-H |
| Amine equivalent (actual) | 1,101 | 1,968 | 1,173 | 2,843 | 1,371 |
| Amine equivalent (theoretical) | 1,045 | 1,800 | 1,150 | 2,280 | 1,225 |
| NCO/OH ratio | 2 | 1.5 | 2 | 1.5 | 2 |
| Aryl OH/aliphatic OH | 1:1 | 1:1 | | 0.93:1 | |

Films were prepared from each of the above coating compositions by the conventional "draw-down" technique on polished steel panels as the substratum. The films, of about 3 mils thickness, were dried at ambient temperature and humidity. The characteristics of the several films are tabulated in the following Table III.

TABLE III

| Film from composition of example | Tack-free time (hrs.) | Sward hardness [1] after— | | | | |
|---|---|---|---|---|---|---|
| | | 1 day | 2 days | 3 days | 4 days | 1 week |
| 1 | 5-6 | 34 | 38 | 49 | 56 | 56 |
| 2 | 1-2 | 36 | 44 | 56 | 63 | 68 |
| 3 | 8-16 | 10 | 18 | 24 | 30 | 30 |
| 4 | 1-2 | 20 | 27 | 30 | 32 | 32 |
| 5 | >16 | 2 | 4 | 6 | 6 | 10 |

[1] Method described in "Physical and Chemical Examination Paints, Varnishes, Lacquers, Colors," Gardner and Sward, 11th ed. 1950, pages 164-6.

These data indicate that films from coating compositions containing mixtures of oxyalkylene ether derivatives of aromatic diols and aliphatic polyols not only dry much faster than comparable films prepared from coatings containing aliphatic polyols only but also attain better hardness.

It can thus be seen that an efficient and economical procedure has been devised to prepare quick-drying coating compositions based on aliphatic polyisocyanates, preferably 4,4'-methylene-bis(4-cyclohexylisocyanate) which coatings not only are nonyellowing urethane coatings but also possess surprisingly outstanding hardness characteristics.

The above examples and variations alluded to in this specification have been given for the purpose of illustrating the scope of the invention. Other variations in the details set out in the above can be made as will be obvious to those skilled in this art. Such variations which do not depart from the spirit of the invention are to be included within the scope of the invention which is limited only by the claims appended hereto.

I claim:

1. A coating composition characterized by quick-drying and excellent hardness properties comprising a reaction product in an inert organic solvent of an isocyanate selected from the group consisting of methylene-bis(4-cyclohexylisocyanate) and an adduct thereof with a polyhydroxy compound, said adduct having free isocyanato groups, and a mixture of polyols having an average functionality of at least 2 comprising (1) an aliphatic polyol selected from the group consisting of polyalkylene ether polyols, hydroxyl terminated polyesters of aliphatic acids and mixtures thereof, and (2) an oxyalkylene ether of an aromatic diol, said diol being the reaction product of a dihydric phenol and an alkylene oxide selected from the group consisting of ethylene oxide, propylene oxide and mixtures thereof, said mixture providing at least 0.3 equivalent of hydroxyl group derived from the aromatic diol for each equivalent of hydroxyl group derived from the aliphatic polyol, said isocyanate providing at least 1.5 NCO groups per hydroxyl group.

2. A composition as claimed in claim 1 wherein said aliphatic polyol is a hydroxyl rich fatty acid ester derived from castor oil.

3. A composition as claimed in claim 1 wherein said aliphatic polyol is a polyalkylene ether triol.

4. A composition as claimed in claim 1 wherein said mixture provides from 0.5 to about 2 equivalents of hydroxyl groups derived from the aromatic diol for each equivalent of hydroxyl group derived from the aliphatic polyol.

5. A composition as claimed in claim 1 wherein said polyol (1) is polypropylene ether triol having a molecular weight of about 1000 and hydroxyl number of 160 and said polyol (2) is propylene oxide derivative of 4,4'-isopropylidenediphenol having an equivalent weight of about 200 to 210 and hydroxyl number of about 270 to 280.

6. A composition as claimed in claim 5 wherein said mixture provides from 0.5 to about 2 equivalents of hydroxyl groups derived from the diphenol for each equivalent of hydroxyl group derived from the triol.

7. A composition as claimed in claim 1 wherein said mixture of polyols has an average functionality within the range of about 2.2 to 2.8.

References Cited

UNITED STATES PATENTS

| | | |
|---|---|---|
| 3,357,954 | 12/1967 | Kirkaldy. |
| 3,335,191 | 8/1967 | Brack. |
| 3,265,641 | 8/1966 | Wismer et al. |
| 3,252,944 | 5/1966 | Curtis et al. |
| 3,078,257 | 2/1963 | Rinke et al. |

FOREIGN PATENTS 582,864  9/1959  Canada.

DONALD E. CZAJA, Primary Examiner.

C. WARREN IVY, Assistant Examiner.

U.S. Cl. X.R.

260—47, 75, 77.5